(12) United States Patent
Matsushima

(10) Patent No.: US 8,295,757 B2
(45) Date of Patent: Oct. 23, 2012

(54) DOCUMENT FEEDER AND DOCUMENT SCANNING DEVICE PROVIDED WITH THE SAME

(75) Inventor: Ryoichi Matsushima, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 487 days.

(21) Appl. No.: 12/566,864

(22) Filed: Sep. 25, 2009

(65) Prior Publication Data

US 2010/0080639 A1   Apr. 1, 2010

(30) Foreign Application Priority Data

Sep. 26, 2008   (JP) .................................. 2008-247707

(51) Int. Cl.
*G03G 15/00* (2006.01)
(52) U.S. Cl. ........................................ 399/374; 399/367
(58) Field of Classification Search .................. 399/374; 271/212, 65, 292
See application file for complete search history.

(56) References Cited

U.S. PATENT DOCUMENTS

| | | | |
|---|---|---|---|
| 5,791,645 A | 8/1998 | Takada | |
| 6,095,517 A * | 8/2000 | Dinatale | 271/212 |
| 7,532,850 B2 * | 5/2009 | Won | 399/365 |
| 2007/0003344 A1 * | 1/2007 | Lee et al. | 399/374 |

FOREIGN PATENT DOCUMENTS

| | | |
|---|---|---|
| EP | 2 096 064 A2 | 2/2009 |
| JP | 08-282897 | 10/1996 |
| JP | 08-310740 | 11/1996 |

OTHER PUBLICATIONS

EP Extended Search Report dated Jan. 11, 2012 in corresponding Application No:. 09170934.5.

* cited by examiner

*Primary Examiner* — Judy Nguyen
*Assistant Examiner* — Blake A Tankersley
(74) *Attorney, Agent, or Firm* — Banner & Witcoff, Ltd.

(57) ABSTRACT

A document feeder includes a feed tray, a catch tray, a carrying path extending from the feed tray to the catch tray via a scanning position, a reversal path diverging from a point on the carrying path downstream relative to the scanning position and connecting to a point on the carrying path upstream relative to the scanning position, a switchback mechanism conveying a sheet back to front from the reversal path toward the scanning point, an ejection mode switching mechanism having a flap provided upstream relative to the catch tray movably relative to an ejection roller, the ejection mode switching mechanism switching an ejection mode by moving the flap between a first mode to eject the sheets on already-ejected sheets and a second mode to insert the sheets under already-ejected sheets. The flap forms part of the reversal path in the first mode.

18 Claims, 6 Drawing Sheets

DOCUMENT FEEDER AND DOCUMENT SCANNING DEVICE PROVIDED WITH THE SAME

CROSS-REFERENCE TO RELATED APPLICATION

This application claims priority under 35 U.S.C. §119 from Japanese Patent Application No. 2008-247707 filed on Sep. 26, 2008. The entire subject matter of the application is incorporated herein by reference.

TECHNICAL FIELD

The following description relates to one or more document feeders configured to feed a document sheet from a feed tray to a catch tray.

RELATED ART

So far a document feeder has been known which is configured to achieve a single-side scanning mode for scanning only one side of each document sheet and a double-side scanning mode for scanning both sides of each document sheet with a switchback mechanism. Specifically, for instance, the document feeder includes a feed tray configured to be loaded with document sheets thereon, a first catch tray disposed above the feed tray, a carrying path configured to guide the document sheets from the feed tray to the first catch tray via a scanning position, a reversal mechanism configured to reverse (turn upside down) a document sheet scanned in the scanning position and again feed the reversed sheet to the scanning position, and a second catch tray disposed beside the scanning position (downstream relative to the scanning position in a carrying direction).

In the document feeder, in the single-side scanning mode, a document sheet is scanned from beneath in the scanning position and conveyed to the second catch tray disposed beside the scanning position with the scanned surface of the sheet down. Thereby, plural document sheets with the scanned surfaces thereof down are stacked in order of page, sequentially from the bottom. Further, in the double-side scanning mode, first, a lower surface of a document sheet as a first page is scanned from beneath in the scanning position. Then, the document sheet is turned upside down by the switchback mechanism, and the other surface of the sheet as a second page is again scanned from beneath in the scanning position. After that, the document sheet is reversed and conveyed to the first catch tray. Thereby, plural document sheets with the first pages thereof down are stacked in order of page, sequentially from the bottom.

SUMMARY

However, the aforementioned known technology requires the second catch tray disposed beside the scanning position. Thus, it results in an undesirably larger size of document feeder.

Aspects of the present invention are advantageous to provide one or more improved document feeders and document scanning devices that make it possible to stack document sheets in order of page in any one of a single-side scanning mode and a double-side scanning mode without having to increase the size thereof.

According to aspects of the present invention, a document feeder configured to feed document sheets is provided. The document feeder includes a feed tray configured to be loaded with the document sheets to be fed, a catch tray configured to be loaded with the document sheets ejected thereon, a carrying path configured to guide the document sheets in a carrying direction from the feed tray to the catch tray via a scanning position where the document sheets are scanned, a reversal path configured to diverge from a diverging point on the carrying path and connect to a converging point on the carrying path, the diverging point being located downstream relative to the scanning position in the carrying direction, the converging point being located upstream relative to the scanning position in the carrying direction, a switchback mechanism provided on the reversal path, the switchback mechanism being configured to convey a document sheet from the reversal path back to the converging point with a previous trailing end of the document sheet as a new leading end thereof in the carrying direction, an ejection roller configured to eject the document sheets onto the catch tray, and an ejection mode switching mechanism having a flap provided upstream relative to the catch tray in the carrying direction in a manner movable up and down relative to the ejection roller, the ejection mode switching mechanism configured to, with the flap being moved up and down, switch an ejection mode between a first mode and a second mode, the first mode being an ejection mode in which the document sheets are sequentially ejected on a stack of already-ejected document sheets on the catch tray, the second mode being an ejection mode in which the document sheets are sequentially ejected and inserted under a stack of already-ejected document sheets on the catch tray. The flap is configured to form part of the reversal path in the first mode.

According to aspects of the present invention, further provided is a document scanning device configured to scan document sheets, which includes a document feeder configured to feed the document sheets to be scanned. The document feeder includes a feed tray configured to be loaded with the document sheets to be fed, a catch tray configured to be loaded with the document sheets ejected thereon, a carrying path configured to guide the document sheets in a carrying direction from the feed tray to the catch tray via a scanning position where the document sheets are scanned, a reversal path configured to diverge from a diverging point on the carrying path and connect to a converging point on the carrying path, the diverging point being located downstream relative to the scanning position in the carrying direction, the converging point being located upstream relative to the scanning position in the carrying direction, a switchback mechanism provided on the reversal path, the switchback mechanism being configured to convey a document sheet from the reversal path back to the converging point with a previous trailing end of the document sheet as a new leading end thereof in the carrying direction, an ejection roller configured to eject the document sheets onto the catch tray, and an ejection mode switching mechanism having a flap provided upstream relative to the catch tray in the carrying direction in a manner movable up and down relative to the ejection roller, the ejection mode switching mechanism configured to, with the flap being moved up and down, switch an ejection mode between a first mode and a second mode, the first mode being an ejection mode in which the document sheets are sequentially ejected on a stack of already-ejected document sheets on the catch tray, the second mode being an ejection mode in which the document sheets are sequentially ejected and inserted under a stack of already-ejected document sheets on the catch tray. The flap is configured to form part of the reversal path in the first mode.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompany drawings.

In the following description, a "carrying direction" represents a direction in which a document sheet is conveyed from a feed tray 10 to a catch tray 20 (a direction indicated by bold arrows in FIG. 1). In addition, a "discharging direction" represents a direction in which a document sheet is ejected from a document feeder unit 30 to the catch tray 20. Further, an upstream side and a downstream side in the carrying direction and the discharging direction will simply be referred to as an "upstream side" and a "downstream side," respectively. A direction perpendicular to the carrying direction and the discharging direction (namely, a direction perpendicular to FIG. 1) will be referred to as a "width direction."

Figure 1:
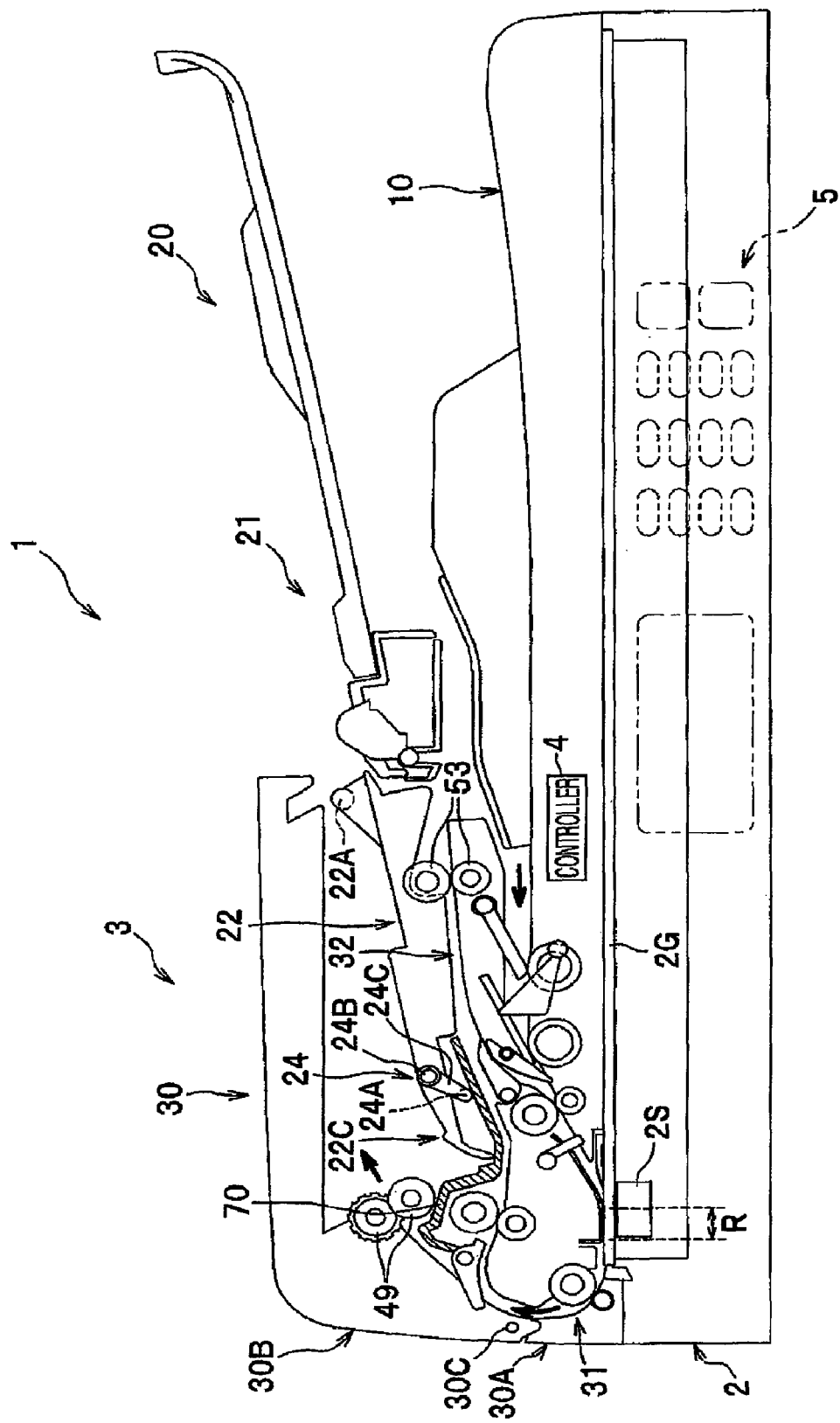
FIG. 1 is a cross-sectional side view showing an overall configuration of a document scanning device provided with a document feeder in an embodiment according to one or more aspects of the present invention.

As illustrated in FIG. 1, a document scanning device 1 includes a flatbed scanner 2 with a known configuration, a document feeder 3 configured to convey a document sheet to a scanning position R, a controller 4 configured to control an operation of scanning the document sheet, and an operation unit 5 configured to accept a user input therethrough.

<Configuration of Flatbed Scanner>

The flatbed scanner 2, disposed at a lower side of the document scanning device 1, includes a platen glass 2G on which a document sheet is statically placed and an image sensor 2S. The flatbed scanner 2 is configured to scan, with the image sensor 2S, a document sheet statically placed on the platen glass 2G as well as a document sheet conveyed into the scanning position R.

<Configuration of Document Feeder>

The document feeder 3 is a device adapted to convey a document sheet to the scanning position R and to scan one side or both sides of the document sheet. The document feeder 3 is provided above the flatbed scanner 2 in a manner openable and closable relative to the platen glass 2G. The document feeder 3 includes the feed tray 10 on which document sheets are placed, the catch tray 20 onto which the document sheets are ejected, and the document feeder unit 30.

[Configuration of Catch Tray]

The catch tray 20, provided above the feed tray 10, includes a fixed tray 21 and a flap 22 disposed upstream relative to the fixed tray 21.

The fixed tray 21 is fixed to a main body frame 30A constituting an outer frame of the document feeder unit 30, so as not to move relative to the document feeder unit 30. An upper portion of the main body frame 30A is configured as a cover 30B which is formed in an L-shape in a cross-sectional side view as illustrated in FIG. 1. Further, the cover 30B is configured to be turned up around a rotational shaft 30C provided at a lower left end in FIG. 1. Thereby, part of a below-mentioned carrying path 31 is rendered open to the upper outside (see FIG. 6).

The flap 22 is supported by the main body frame 30A of the document feeder 3, swingably in the vertical direction relative to the fixed tray around a swing shaft 22A that is provided at a downstream side of the flap 22. The flap 22 has a bending portion 22C formed to bend downward, at an upstream distal end of the flap 22. In addition, a cam 24 engages with an upstream distal end portion of the flap 22.

The cam 24 includes a pushing-up bar 24A that is provided below the flap 22 so as to extend over between both ends of the flap 22 in the width direction, two shafts 24B provided at both sides of the flap 22 in the width direction, and a joint 24C configured to connect both ends of the pushing-up bar 24A in the width direction with the shafts 24B, respectively. Each of the shafts 24B is pivotably supported by the main body frame 30A.

Figure 5:
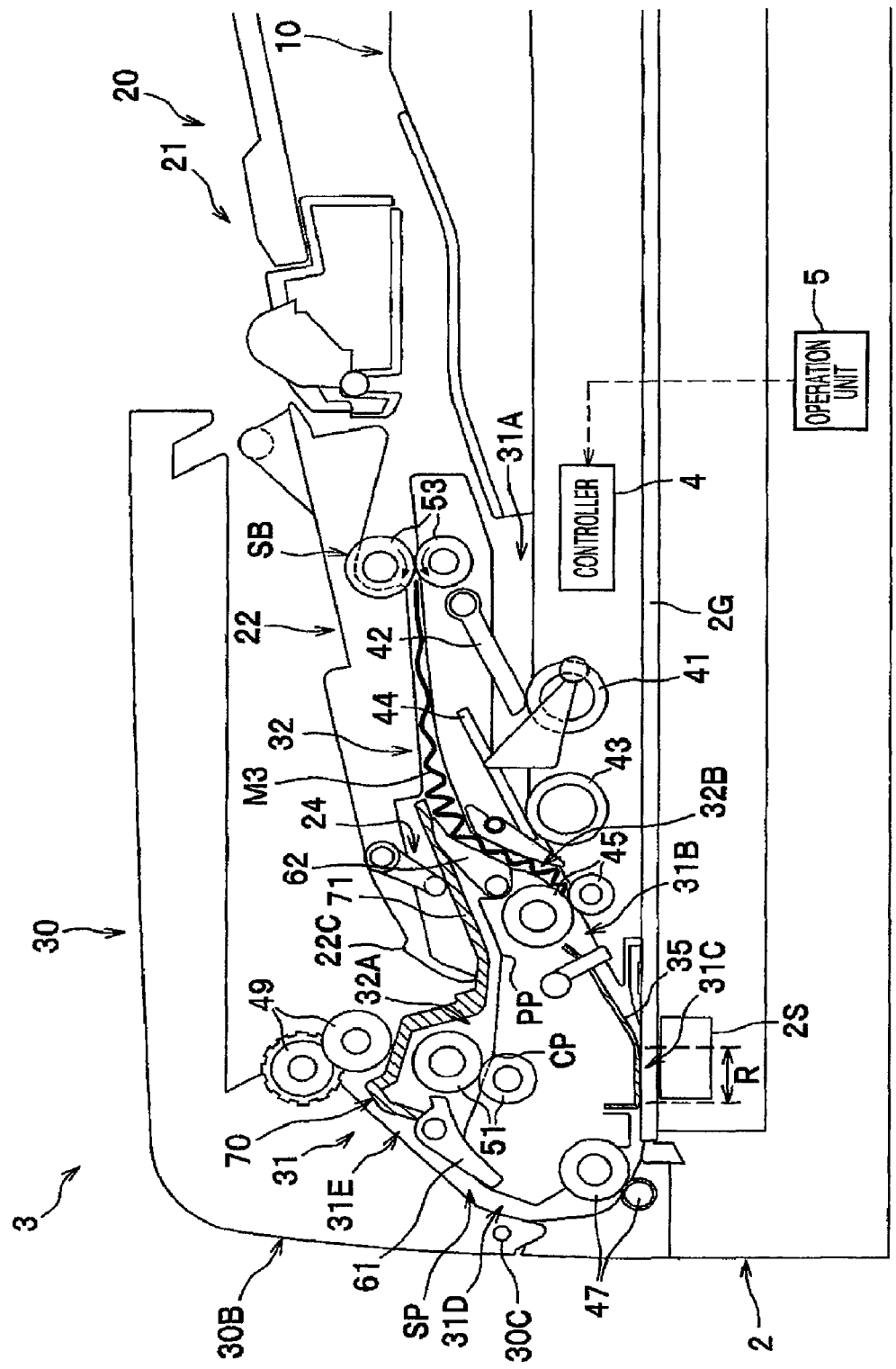
FIG. 5 shows a state where a document sheet jams within a reversal path in the embodiment according to one or more aspects of the present invention.

The cam 24 is configured to swing the flap 22 between a lower position as shown in FIG. 1 and an upper position as shown in FIG. 5 when rotated clockwise or counterclockwise by a driving mechanism (not shown) controlled by the controller 4. Thereby, an ejection mode to eject document sheets is switched between below-mentioned two modes of a stacking ejection mode and an inserting ejection mode.

Figure 4:
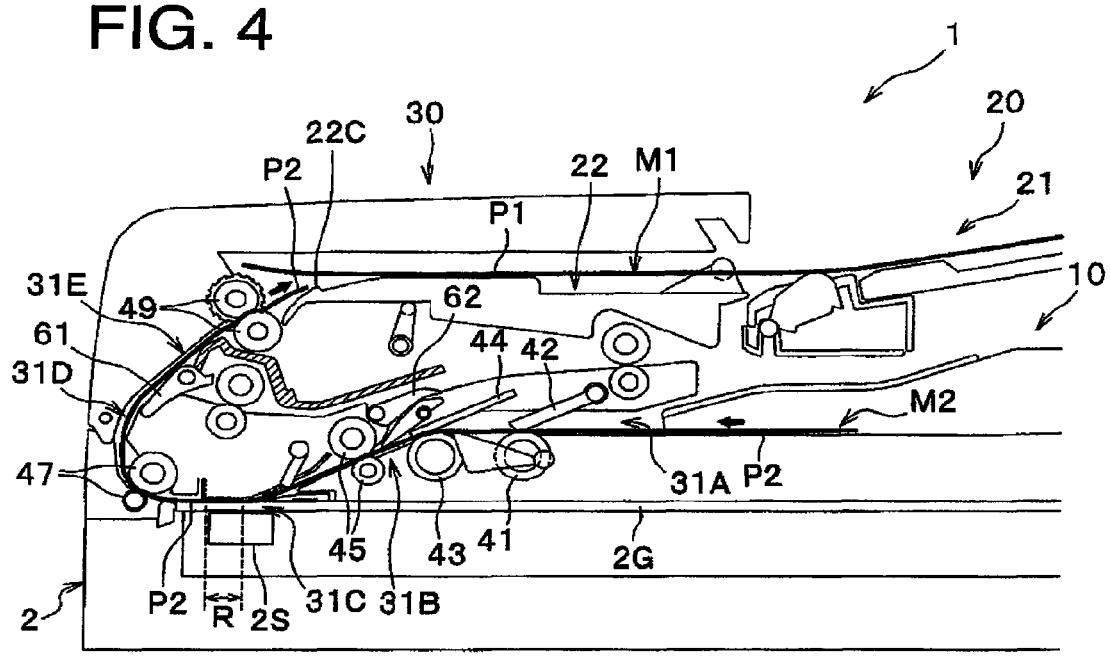
FIG. 4 illustrates an operation in a single-side scanning mode in the embodiment according to one or more aspects of the present invention.

Further, when the flap 22 is lifted up manually by the user in the state where the document feeder 3 is not in use, the flap 22 can be swung higher than shown in FIG. 4. Thereby, part of a below-mentioned reversal path 32 is rendered open to the upper outside (see FIG. 6). In addition, the swing shaft 22A of the flap 22 is disposed farther away from the ejection rollers 49 than below-mentioned switchback rollers 53. Thereby, all the section between the switchback rollers 53 and below-mentioned chute member 70 is rendered open.

[Configuration of Document Feeder Unit]

Figure 2:
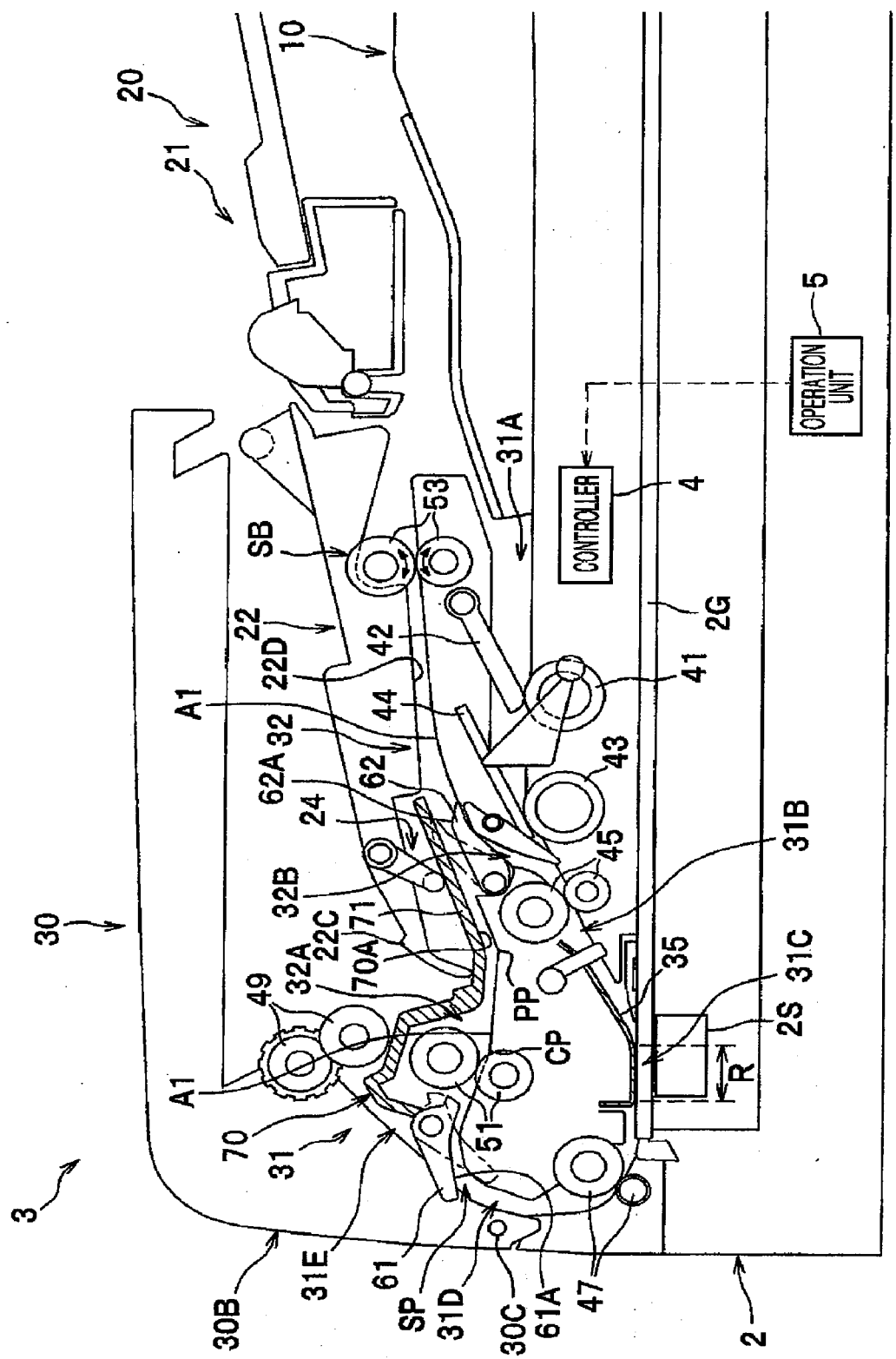
FIG. 2 is an enlarged cross-sectional side view of a document feeder unit in the embodiment according to one or more aspects of the present invention.

As shown in FIG. 2, the document feeder unit 30 includes a carrying path 31 formed to guide a document sheet from the feed tray 10 to the catch tray 20 and a reversal path 32 formed to switchback the document sheet.

The carrying path 31 includes a suction path 31A formed to extend substantially horizontally from the feed tray 10, an oblique path 31B formed to extend obliquely downward from the suction path 31A, a horizontal path 31C formed to extend substantially horizontally from the oblique path 31B, a curved path 31D formed to extend in the shape of an arc upward from the horizontal path 31C, and an ejection path 31E formed to extend obliquely upward from the curved path 31D to the catch tray 20 (outside the carrying path 31). In the carrying path 31, a lower side of the horizontal path 31C corresponds to the scanning position R adapted to face the image sensor 2S across the platen glass 2G.

On the carrying path 31, there is a feeding mechanism provided to feed a document sheet from the feed tray 10 to the catch tray 20 via the scanning position R. The feeding mechanism includes a pickup roller 41, a pickup nipper 42, a separation roller 43, and a separation nipper 44, which are provided on the suction path 31A. The feeding mechanism further includes first feed rollers 45 provided on the oblique path 31B, second feed rollers 47 provided on the curved path 31D, and ejection rollers 49 provided on the ejection path 31E.

The pickup roller 41 and the pickup nipper 42 are configured to make document sheets placed on the feed tray 10 approach to the separation roller 43. The separation roller 43 and the separation nipper 44 are configured to separate the document sheets fed by the pickup roller 41 and the pickup nipper 42 and to convey the document sheets to the scanning position R separately on a sheet-by-sheet basis. In addition, the first feed rollers 45 and the second feed rollers 47 are configured to feed the document sheets on the carrying path 31. Further, the ejection rollers 49 are configured to eject onto the catch tray 20 the document sheets that have completely been scanned.

The reversal path 32 includes a first reversal path 32A and a second reversal path 32B. The first reversal path 32A is configured to guide part (substantially all) of a document sheet to the outside of the document feeder unit 30 in a switchback operation. The second reversal path 32B is configured to, after the switchback operation, again guide the document sheet to the scanning position R.

The first reversal path 32A is formed to diverge from the carrying path 31 at a diverging point SP on a downstream side relative to the scanning position R (i.e., at a downstream end of the curved path 31D) and to extend toward the outside (rightward in FIG. 2). Specifically, the first reversal path 32A includes an S-shaped path formed with an upward-convex curved section extending from the diverging point SP and a downward-convex curved section following the upward-convex curved section. The first reversal path 32A has an upper guide surface which is formed with a lower surface 61A of a first guide member 61 (indicated by a solid line in FIG. 2), a lower surface 70A of a chute member 70 fixed to the main body frame 30A, and a lower surface 22D of the flap 22 staying in a lower position. Further, the first reversal path 32A has a lower guide surface which is formed with an upper surface A1 of the main body frame 30A and an upper surface of the second guide member 62 (indicated by a solid line in FIG. 2).

Namely, the lower surface 22D of the flap 22 constitutes part of an upper wall of the first reversal path 32A. In addition, the chute member 70 is disposed below a distal end of the flap 22 and provided with a guide portion 71 that is disposed downstream relative to below-mentioned third feed rollers 51. The guide portion 71 constitutes part of the upper wall of the first reversal path 32A. Thus, most of the upper wall of the first reversal oath 32A is formed with the guide portion 71 and part of the flap 22 that are aligned side by side.

The second reversal path 32B is configured to diverge from substantially a center of the first reversal path 32A and extend obliquely down toward the oblique path 31B i.e., toward an upstream side relative to the scanning position R). On the reversal path 32 configured as above, a reversal mechanism is provided, which is configured to feed and guide a document sheet in the switchback operation.

The reversal mechanism includes third feed rollers 51 that serve as subsidiary rollers to feed a document sheet and switchback rollers 53, a first guide member 61 provided at a diverging portion between the curved path 31D and the first reversal path 32A, and a second guide member 62 provided at a diverging portion between the first reversal path 32A and the second reversal path 32B.

The third feed rollers 51 are configured to feed a document sheet toward the outside, and disposed upstream relative to an apex PP of the downward-convex curved section of the S-shaped first reversal path 32A. More specifically, the third feed rollers 51 are disposed upstream relative to an inflection point CP (between the upward-convex curved section and the downward-convex curved section) of the S-shaped first reversal path 32A.

The switchback rollers 53 are disposed at a downstream end of the first reversal path 32A, and configured to switchback a document sheet (i.e., reverse a traveling direction of the conveyed document sheet with a previous trailing end of the document sheet as a new leading end thereof).

The first guide member 61 is configured to be swung up and down. When swung down (see a dashed line in FIG. 2), the first guide member 61 constitutes a lower guide surface of the ejection path 31E. Meanwhile, when swung up (see a solid line in FIG. 2), the first guide member 61 constitutes an upper guide surface of the first reversal path 32A, so as to guide a document sheet to the reversal path 32.

The second guide member 62 is configured to be swung up and down. When swung down (see a solid line in FIG. 2), the second guide member 62 constitutes a lower guide surface of the first reversal path 32A, so as to guide a document sheet to the outside. Meanwhile, when swung up (see a dashed line in FIG. 2), the second guide member 62 constitutes an upper guide surface of the second reversal path 32B, so as to guide a document sheet from the first reversal path 32A to the second reversal path 32B.

<Configurations of Controller and Operation Unit>
The controller 4 is provided with a CPU, a RAM, a ROM, and an input/output circuit (which are not shown), and placed in an adequate position within the document scanning device 1. The controller 4 is configured to, based on programs and data stored on the ROM, or outputs from the operation unit, take control for driving the feeding mechanism, the reversal mechanism, and the image sensor 2S. Thus, the controller 4 takes control of an operation of scanning document sheets.

The operation unit 5 is configured with a plurality of operation buttons (see FIG. 1). When the user operates the operation unit 5, the user can input an instruction to start document scanning (that is, an instruction to start document feeding for the document feeder 3) or select either a single-side scanning mode (an inserting ejection mode) or a double-side scanning mode (a stacking ejection mode).

<Operations of Document Scanning Device>
Hereinafter, operations of the document scanning device 1 configured as above will be set forth.

Figure 3A:
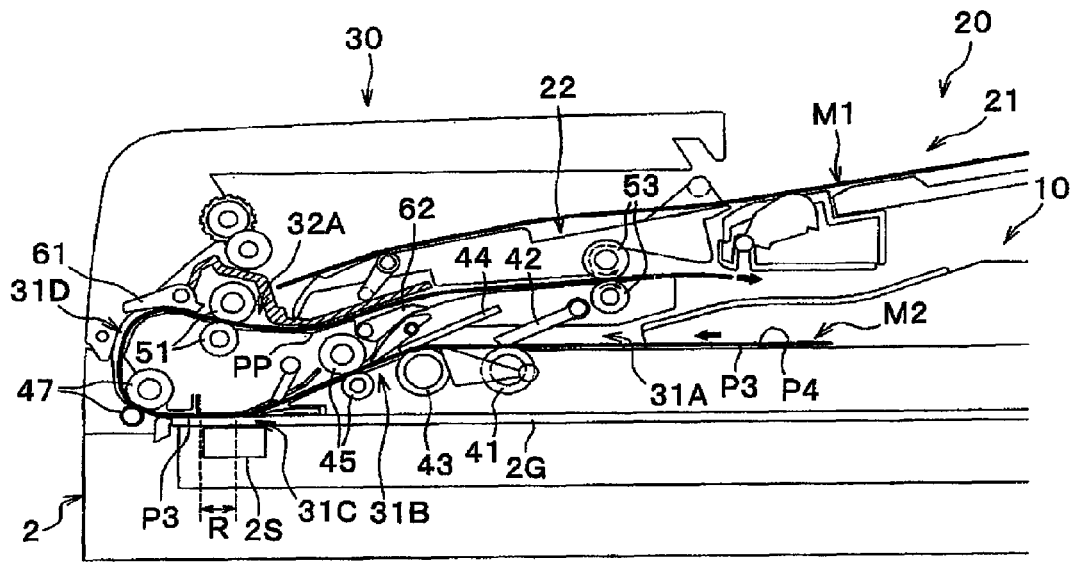
FIGS. 3A and 3B illustrate operations in a double-side scanning mode in the embodiment according to one or more aspects of the present invention.
Figure 3B:
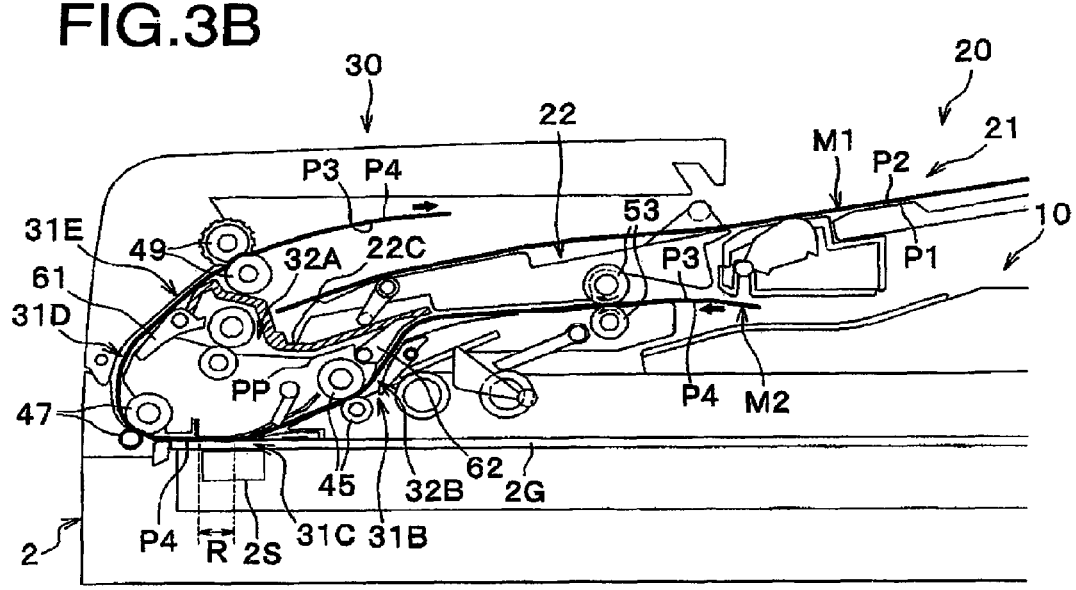

[Operations in Double-Side Scanning Mode]
As illustrated in FIG. 3A, in the double-side scanning mode, a document sheet M2 is set on the feed tray 10 with a first scanned surface P3 down and a second scanned surface P4 up. Additionally, when the user operates the operation unit 5 and selects the double-side scanning mode, the flap 22 swings down, the first guide member 61 swings up, and the second guide member 62 swings down.

When the user inputs the instruction to start document scanning, the document sheet M2 on the feed tray 10 is conveyed to the scanning position R by the separation roller 43 and the first feed rollers 45, and then the first scanned surface P3 is scanned. Thereafter, the document sheet M2 is conveyed on the curved path 31D by the second feed rollers 47, and fed along a lower surface of the first guide member 61 into the first reversal path 32A. At this time, the document sheet M2 is with the first scanned surface P3 up and the second scanned surface P4 down. Thereafter, the document sheet M2 is conveyed, by the third feed rollers 51, on the first reversal path 32A toward the outside. At this time, the document sheet M2, to which a traveling force is given by the third feed rollers 51, is conveyed toward the outside in a preferable manner, without jamming at the apex PP of the downward-convex curved section of the S-shaped first reversal path 32A.

Thereafter, when almost completely the document sheet M2 is ejected from the switchback rollers 53, the switchback rollers 53 are temporarily stopped by a known control technique. In addition, the first guide member 61 swings down and the second guide member 62 swings up such that the path of the document sheet M2 is switched.

Then, with the switchback rollers 53 being reversely rotated, the document sheet M2 is pulled back to the first reversal path 32A, and then fed along a lower surface of the second guide member 62 into the second reversal path 32B. Thus, the document sheet M2 is conveyed again to the oblique path 31B, and fed to the scanning position R by the first feed rollers 45 such that the second scanned surface P4 is scanned. After that, the document sheet M2 is conveyed on the curved path 31D and the ejection path 31E by the second feed rollers 47 and the ejection rollers 49, and then ejected onto the catch tray 20 with the first scanned surface P3 down and the second scanned surface P4 up.

In the state where the flap 22 is in the lower position, the bending portion 22C of the flap 22 is located below the ejection rollers 49. Therefore, a trailing end of an already-ejected document sheet M1 loaded on the bending portion 22C is located lower than the ejection rollers 49. Thereby, the later-ejected document sheet M2 is placed onto the already-ejected document sheet M1 on the catch tray 20. The ejection mode at this time is referred to as the stacking ejection mode.

In the stacking ejection mode, document sheets are sequentially ejected on a stack of document sheets that have already been ejected with the first scanned surfaces thereof down and the second scanned surfaces thereof up. Therefore, the document sheets M1 and M2 are aligned in the order of pages P1, P2, P3, and P4 from the bottom. The order of the pages is the same as when the documents M1 and M2 are placed on the feed tray 10.

[Operations in Single-Side Scanning Mode]
As illustrated in FIG. 4, in the single-side scanning mode, the document sheet M2 is set on the feed tray 10 with the scanned surface P2 down. Further, when the user selects the single-side scanning mode through the operation unit 5, the flap 22 swings up and the first guide member 61 swings down.

When the user inputs the instruction to start document scanning, the document sheet M2 on the feed tray 10 is conveyed to the scanning position R by the separation roller 43 and the first feed rollers 45, and then the scanned surface P2 is scanned. Thereafter, the document sheet M2 is fed on the curved path 31D and the ejection path 31E by the second feed rollers 47 and the ejection rollers 49, and then ejected onto the catch tray 20 with the scanned surface P2 up.

In the state where the flap 22 is in the upper position, the bending portion 22C of the flap 22 is located above a position where the two ejection rollers 49 nip a sheet. Therefore, a trailing end, placed on the flap 22, of the already-ejected document sheet M1 is located above the position where the two ejection rollers 49 nip a sheet. Thereby, the later-ejected document sheet M2 establishes contact, from beneath, with the trailing end of the already-ejected document sheet M1 on the catch tray 20, and then is ejected in a manner inserted under the document sheet M1. The ejection mode at this time is referred to as the inserting ejection mode.

In the inserting ejection mode, document sheets are sequentially ejected in a manner inserted under a stack of already-ejected document sheets, with the scanned surfaces up. Therefore, the document sheets M1 and M2 are aligned in the order of the pages P1 and P2 from the top. The order of the pages is the same as when the document sheets M1 and M2 are placed on the feed tray 10.

<Method for Settling Jam>
Subsequently, a description will be given to set forth a method for removing a document sheet jammed on the reversal path 32.

Figure 6:
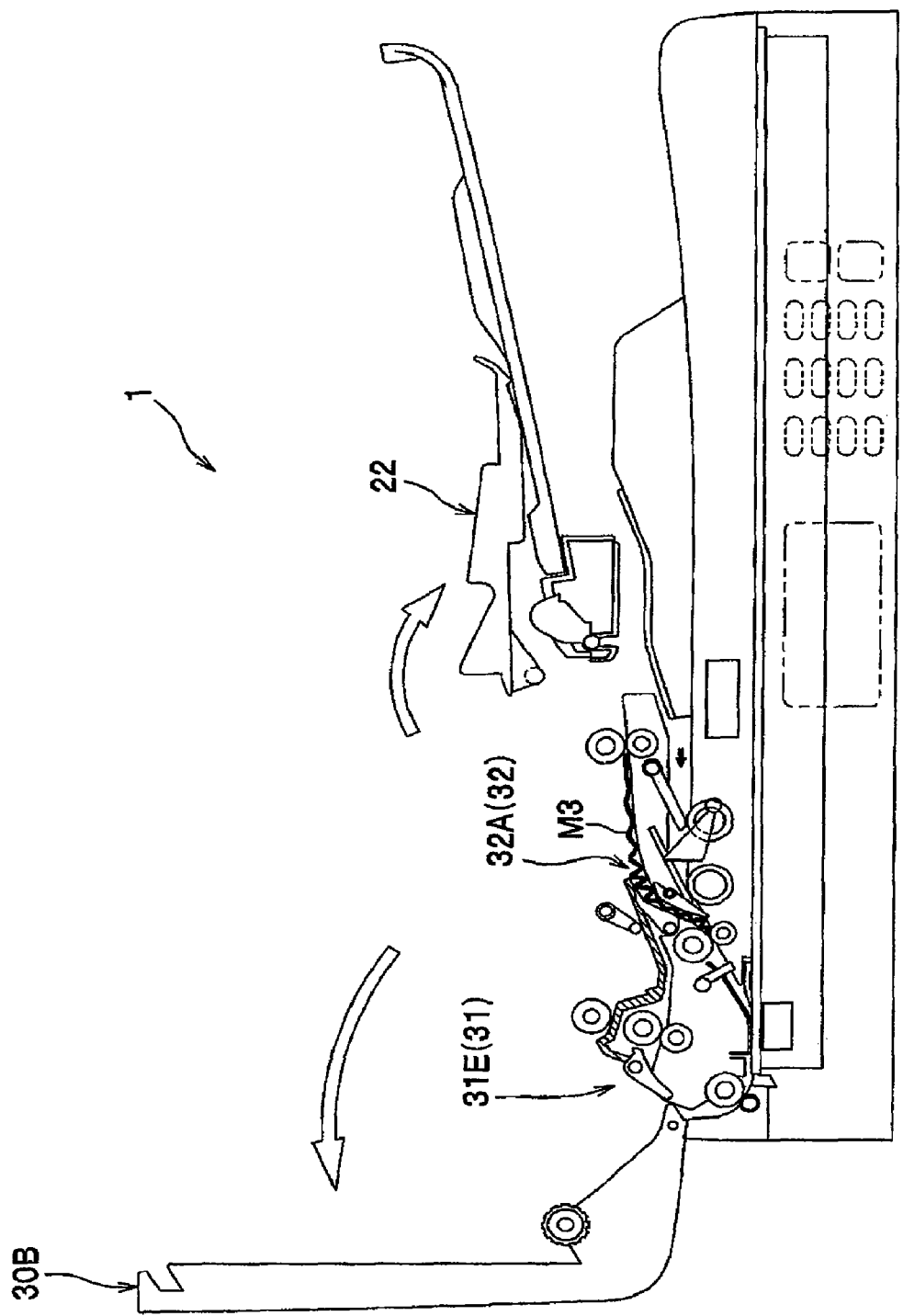
FIG. 6 illustrates a method for settling a jam in the embodiment according to one or more aspects of the present invention.

For example, as shown in FIG. 5, it is assumed that when a short document sheet M3 such as a postcard is conveyed from the switchback rollers 53 to the scanning position R, the document sheet M3 is jammed at the first feed rollers 45. In such a situation, the document sheet M3 is entirely within the reversal path 32, and might not be removed by an external user operation. In this case, as illustrated in FIG. 6, when the user opens the cover 30B and then opens the flap 22, part of the reversal path 32 is rendered open to the upper outside such that the document sheet M3 jammed can be exposed to the outside. Therefore, by manually pulling the document sheet M3 exposed to the outside, the user can easily remove the document sheet M3.

According to the embodiment, the following effects can be provided. The ejection mode can be switched between the stacking ejection mode and the inserting ejection mode by swinging the flap 22 up and down. Therefore, in the single-side scanning, document sheets can be aligned in order of page from the top in the inserting ejection mode. Further, in the double-side scanning, document sheets can be aligned in order of page from the bottom in the stacking ejection mode. Since the document alignment order is switched by swinging the flap 22 up and down, only the single catch tray 20 onto which document sheets are ejected has to be provided above the feed tray 10. Hence, compared with a known configuration in which an additional catch tray is provided beside a scanning position, the document feeder 3 can relatively be downsized. Moreover, since the flap 22 constitutes part of the reversal path 32, the document feeder 3 can be more downsized than a configuration in which a specific component is provided to constitute the reversal path 32.

Furthermore, since it is possible to render part of the reversal path 32 open by swinging the flap 22, a document sheet jammed within the reversal path 32 can easily be removed.

As the swing shaft 22A of the flap 22 is disposed farther away from the ejection rollers 49 than the switchback rollers 53, all the section between the switchback rollers 53 and the chute member 70 is rendered open. Thus it is possible to easily settle a jam.

The third feed rollers 51 are provided downstream relative to the apex PP of the downward-convex curved section of the S-shaped first reversal path 32A. Therefore, even though the leading end of the document sheet nearly gets stacked in the vicinity of the apex PP of the flexural section, the document sheet is forcibly pushed by the third feed rollers 51 and the leading end of the document sheet can proceed. Hence, it is possible to prevent a jam from occurring within the first reversal path 32A. Further, in the embodiment, the third feed rollers 51 are provided upstream relative to the inflection point CP of the S-shaped first reversal path 32A. Therefore, it is possible to prevent the leading end of the document sheet from getting stacked in the vicinity of the inflection point CP of the S-shaped first reversal path 32A and thus to prevent a jam more effectively from occurring within the first reversal path 32A.

The chute member 70 is disposed downstream relative to the third feed rollers 51, below the distal end of the flap 22. Therefore, when a document sheet pushed out of the third feed rollers 51 is conveyed while pushing up the distal end of the flap 22, the chute member 70 can prevent the document sheet from straying from the first reversal path 32A.

As the swingable cover 30B constitutes the ejection path 31E, even though a document sheet (a short sheet such as a postcard) jams within the ejection path 31E, the user can easily remove the document sheet by opening the cover 30B.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, the third feed rollers 51 are disposed upstream relative to the inflection point CP of the S-shaped first reversal path 32A. However, the third feed rollers 51 may be placed at the inflection point CP. Such a configuration can achieve the same effects as the aforementioned embodiment. In the aforementioned embodiment, the flap 22 is configured to swing. However, the flap 22 may be configured to slide up and down.

In the aforementioned embodiment, the mechanism for switching the ejection mode is configured with the flap 22 and the cam 24. However, without the cam 24 being provided, a flap, which is configured to be swung up and down by a driving force transmitted to a swing shaft thereof, may be provided to switch the ejection mode.

What is claimed is:

1. A document feeder configured to feed document sheets, comprising:
   a feed tray configured to be loaded with the document sheets to be fed;
   an ejection roller configured to eject the document sheets;
   a fixed tray disposed in a position relative to the ejection roller, the fixed tray being configured to be loaded with the document sheets ejected thereon by the ejection roller;
   a carrying path configured to guide the document sheets in a carrying direction from the feed tray to the fixed tray via a scanning position where the document sheets are scanned;
   a reversal path configured to diverge from a diverging point on the carrying path and connect to a converging point on the carrying path, the diverging point being located downstream relative to the scanning position in the carrying direction, the converging point being located upstream relative to the scanning position in the carrying direction;
   a switchback mechanism provided on the reversal path, the switchback mechanism being configured to convey a document sheet from the reversal path back to the converging point with a previous trailing end of the document sheet as a new leading end thereof in the carrying direction; and
   an ejection mode switching mechanism having a movable flap provided upstream relative to the fixed tray in the carrying direction in a manner movable up and down relative to the ejection roller, the ejection mode switching mechanism configured to, with the movable flap being moved up and down, switch an ejection mode between a first mode and a second mode, the first mode being an ejection mode in which the document sheets are sequentially ejected on a stack of already-ejected document sheets on the fixed tray, the second mode being an ejection mode in which the document sheets are sequentially ejected and inserted under a stack of already-ejected document sheets on the fixed tray,
   the movable flap configured to form part of the reversal path in the first mode.

2. The document feeder according to claim 1, further comprising a swing shaft fixed to a main body of the document feeder,
   wherein the flap is supported by the main body in a manner swingable up and down around the swing shaft, and
   wherein the flap is configured to swing to an open position to expose part of the reversal path to an area outside of the document feeder.

3. The document feeder according to claim 2, wherein the swing shaft of the flap is disposed farther away from the ejection roller than the switchback mechanism.

4. The document feeder according to claim 2,
   wherein the reversal path comprises a first reversal path configured to extend from the diverging point to the switchback mechanism,
   wherein the first reversal path comprises an S-shaped path formed with an upward-convex curved section extending from the diverging point and a downward-convex curved section following the upward-convex curved section, and
   wherein the document feeder further comprises a subsidiary roller configured to feed a document sheet, the subsidiary roller being disposed upstream in a reversal carrying direction of the reversal path relative to an apex of the downward-convex curved section.

5. The document feeder according to claim 4, further comprising a chute member comprising a guide portion provided downstream relative to the subsidiary roller in the reversal carrying direction, below a distal end of the swingable flap,
   wherein the reversal path has an upper wall configured with the chute member and the flap.

6. The document feeder according to claim 1,
   wherein the reversal path comprises a first reversal path configured to extend from the diverging point to the switchback mechanism,
   wherein the first reversal path comprises an S-shaped path formed with an upward-convex curved section extending from the diverging point and a downward-convex curved section following the upward-convex curved section, and
   wherein the document feeder further comprises a subsidiary roller configured to feed a document sheet, the subsidiary roller being disposed upstream in a reversal carrying direction relative to an apex of the downward-convex curved section.

7. The document feeder according to claim 6, wherein the subsidiary roller is disposed upstream in the reversal carrying direction relative to an inflection point of the S-shaped path between the upward-convex curved section and the downward-convex curved section.

8. The document feeder according to claim 6, wherein the reversal path comprises a second reversal path configured to diverge from a middle portion of the first reversal path and extend to the converging point on the carrying path.

9. The document feeder according to claim 1, wherein the fixed tray is disposed above the feed tray.

10. A document scanning device configured to scan document sheets, comprising a document feeder configured to feed the document sheets to be scanned,
wherein the document feeder comprises:
a feed tray configured to be loaded with the document sheets to be fed;
an ejection roller configured to eject the document sheets;
a fixed tray disposed in a position relative to the ejection roller, the fixed tray being configured to be loaded with the document sheets ejected thereon by the ejection roller;
a carrying path configured to guide the document sheets in a carrying direction from the feed tray to the fixed tray via a scanning position where the document sheets are scanned;
a reversal path configured to diverge from a diverging point on the carrying path and connect to a converging point on the carrying path, the diverging point being located downstream relative to the scanning position in the carrying direction, the converging point being located upstream relative to the scanning position in the carrying direction;
a switchback mechanism provided on the reversal path, the switchback mechanism being configured to convey a document sheet from the reversal path back to the converging point with a previous trailing end of the document sheet as a new leading end thereof in the carrying direction; and
an ejection mode switching mechanism having a movable flap provided upstream relative to the fixed tray in the carrying direction in a manner movable up and down relative to the ejection roller, the ejection mode switching mechanism configured to, with the movable flap being moved up and down, switch an ejection mode between a first mode and a second mode, the first mode being an ejection mode in which the document sheets are sequentially ejected on a stack of already-ejected document sheets on the fixed tray, the second mode being an ejection mode in which the document sheets are sequentially ejected and inserted under a stack of already-ejected document sheets on the fixed tray,
the movable flap configured to form part of the reversal path in the first mode.

11. The document scanning device according to claim 10, wherein the document feeder further comprises a swing shaft fixed to a main body of the document feeder,
wherein the flap is supported by the main body in a manner swingable up and down around the swing shaft, and
wherein the flap is configured to swing to an open position to expose part of the reversal path to an area outside of the document feeder.

12. The document scanning device according to claim 11, wherein the swing shaft of the flap is disposed farther away from the ejection roller than the switchback mechanism.

13. The document scanning device according to claim 11,
wherein the reversal path comprises a first reversal path configured to extend from the diverging point to the switchback mechanism,
wherein the first reversal path comprises an S-shaped path formed with an upward-convex curved section extending from the diverging point and a downward-convex curved section following the upward-convex curved section, and
wherein the document feeder further comprises a subsidiary roller configured to feed a document sheet, the subsidiary roller being disposed upstream in a reversal carrying direction relative to an apex of the downward-convex curved section.

14. The document scanning device according to claim 13,
wherein the document feeder further comprises a chute member comprising a guide portion provided downstream relative to the subsidiary roller in the reversal carrying direction, below a distal end of the swingable flap, and
wherein the reversal path has an upper wall configured with the chute member and the flap.

15. The document scanning device according to claim 10,
wherein the reversal path comprises a first reversal path configured to extend from the diverging point to the switchback mechanism,
wherein the first reversal path comprises an S-shaped path formed with an upward-convex curved section extending from the diverging point and a downward-convex curved section following the upward-convex curved section, and
wherein the document feeder further comprises a subsidiary roller configured to feed a document sheet, the subsidiary roller being disposed upstream in a reversal carrying direction relative to an apex of the downward-convex curved section.

16. The document scanning device according to claim 13, wherein the subsidiary roller is disposed upstream in the reversal carrying direction relative to an inflection point of the S-shaped path between the upward-convex curved section and the downward-convex curved section.

17. The document scanning device according to claim 15, wherein the reversal path comprises a second reversal path configured to diverge from a middle portion of the first reversal path and extend to the converging point on the carrying path.

18. The document scanning device according to claim 10, wherein the fixed tray is disposed above the feed tray.

* * * * *